(12) United States Patent
Khan et al.

(10) Patent No.: US 10,484,318 B2
(45) Date of Patent: *Nov. 19, 2019

(54) MESSAGES AUGMENTED WITH STRUCTURED ENTITIES

(71) Applicant: Microsoft Technology Licensing, LLC, Redmond, WA (US)

(72) Inventors: Sadi Khan, Redmond, WA (US); Kazi Al-Rashid, Redmond, WA (US); Jeremy Bong, Bellevue, WA (US); Arwa Tyebkhan, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/169,067

(22) Filed: Oct. 24, 2018

(65) Prior Publication Data

US 2019/0058678 A1   Feb. 21, 2019

Related U.S. Application Data

(63) Continuation of application No. 15/349,159, filed on Nov. 11, 2016, now Pat. No. 10,142,268, which is a
(Continued)

(51) Int. Cl.
*G06F 17/22* (2006.01)
*H04L 12/58* (2006.01)
(Continued)

(52) U.S. Cl.
CPC ............ *H04L 51/08* (2013.01); *G06F 17/212* (2013.01); *G06F 17/2235* (2013.01);
(Continued)

(58) Field of Classification Search
CPC ....... H04L 51/08; H04W 4/14; G06F 17/2235
See application file for complete search history.

(56) References Cited

U.S. PATENT DOCUMENTS

2005/0114450 A1* 5/2005 DeVos ................ G06F 11/1453
709/206
2007/0150513 A1* 6/2007 Vanden Heuvel .... G06F 17/278
(Continued)

FOREIGN PATENT DOCUMENTS

WO   WO-2007018373 A1 *  2/2007  .............. H04M 3/42

OTHER PUBLICATIONS

"Office Action Issued in European Patent Application No. 13819148.1", dated Dec. 19, 2018, 6 pages.
(Continued)

*Primary Examiner* — Said M Elnoubi
(74) *Attorney, Agent, or Firm* — Goff IP Law PLLC; Jared S. Goff

(57) ABSTRACT

Messages containing structured entities may be sent between devices in a way that leverages the existing Short Message Service (SMS) protocol. On the message sender's device, the sender may author a message indicating specific entities such as people, places, dates, or times. When the message is to be sent, an SMS representation of the message is sent to the recipient, and a full representation of the message, including the included entities, is sent to a server. If the SMS message is received at a device that is equipped with software that can retrieve and render the rich representation, then the device queries the server to determine whether there is a rich message that corresponds to the SMS message. If such a message exists, then the message is communicated to the recipient's device and is rendered in place of the SMS message.

20 Claims, 7 Drawing Sheets

Related U.S. Application Data continuation of application No. 13/723,190, filed on Dec. 20, 2012, now abandoned.

(51) Int. Cl.
*H04W 4/12* (2009.01)
*H04W 4/14* (2009.01)
*G06F 17/21* (2006.01)

(52) U.S. Cl.
CPC .......... *G06F 17/2288* (2013.01); *H04W 4/12* (2013.01); *H04W 4/14* (2013.01)

(56) References Cited

U.S. PATENT DOCUMENTS

| | | | |
|---|---|---|---|
| 2008/0109462 A1* | 5/2008 | Adams | G06Q 10/107 |
| 2009/0063641 A1* | 3/2009 | Lord | G06Q 10/107 |
| | | | 709/206 |
| 2010/0159965 A1* | 6/2010 | Pascal | H04L 51/066 |
| | | | 455/466 |
| 2010/0167766 A1* | 7/2010 | Duarte | H04L 51/16 |
| | | | 455/466 |

OTHER PUBLICATIONS

"Second Office Action Issued in Chinese Patent Application No. 201380066921.1", dated Dec. 17, 2018, 8 Pages.

* cited by examiner

MESSAGES AUGMENTED WITH STRUCTURED ENTITIES

RELATED APPLICATIONS

The present application is a continuation of U.S. application Ser. No. 15/349,159, filed Nov. 11, 2016, which is a continuation of U.S. application Ser. No. 13/723,190, filed Dec. 20, 2012, both of which are incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

People often communicate with each other by message—e.g., via the Short Message Service (SMS) commonly associated with phones, or via various instant messaging (IM) systems. In the past, SMS was effectively the only way to send a text message from a cell phone. SMS messages are generally sent between devices that have phone numbers. These messages are subject to strict size limits, and the sending of such messages is charged by phone carriers at SMS-specific rates. However, many modern cell phones have Internet connectivity and the ability to participate in a wide variety of communication protocols, such as Hypertext Transfer Protocol (HTTP). HTTP has the ability to send transmit content that has a wide variety of features (e.g., links, photos, audio, etc.) and arbitrary length. Additionally, an HTTP message can be sent between any devices that are addressable on the Internet. Such messages are sent using the devices' ordinary Internet service (thereby avoiding the use of SMS-specific pricing, and avoiding any limitations associated with IM systems).

While message sent via HTTP are often more convenient, offer richer content, and are more economical to send, SMS and IM continue to have legacy influence. Many phones have Internet service and can communicate by HTTP, but nearly all phones have SMS. When one person wants to send a message to another, the user often does not know what capabilities are available on the recipient's phone, so the sender often sends an SMS message in order to be able to reach the recipient without regard to what type of device the recipient has. But the decision to use SMS subjects the message to SMS's limitations.

SUMMARY

A message having rich, structured content may be created, and this message may be transmitted to devices that have a wide range of capabilities by leveraging the use of an existing text messaging system, such as SMS or IM. In one example, when a person creates such a message, the user identifies the phone number of the person to whom the message is to be sent. The full structured message is sent to a server, where it is stored for later retrieval. Additionally, an SMS representation of the full message is created, and the SMS representation is sent to the recipient via SMS. The SMS representation contains a link to the underlying message that is stored on the server, as well as a textual representation of the content of the message.

When the recipient's device receives the SMS message, software on that device may be configured to check whether the SMS message refers to richer content stored on the server. If such software is installed on the receiving device, that software may retrieve the underlying content from the server, and may render that content in a rich experience for the recipient. In such a case, the SMS message itself might not be displayed, since it is effectively just a legacy representation of the "real" content that the sending is trying to communicate. However, if the recipient's device does not have software installed that can determine whether the SMS message is a stand-in for richer content, then the SMS message may contain enough text to convey the gist of the message. Additionally, as noted above, the SMS message contains a link to the underlying content on the server, and the recipient can retrieve that link manually in order to view the richer content—e.g., by viewing that content on the mobile device's web browser.

Creation of richer content may be performed in a variety of ways—e.g., through menus or escape characters. For example, if the hash character (#) is used as the escape character, then including text such as "#John" while the message is being composed may create a structured entity representing "John's" contact information. Similarly, "#6:15 pm" may create a calendar entry for the current date at 6:15 p.m. Representations of these entities may be stored, or pointed to, by the rich version of the message, and representations of these entities may be rendered in a variety of ways when the rich content is viewed by the recipient.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 2:
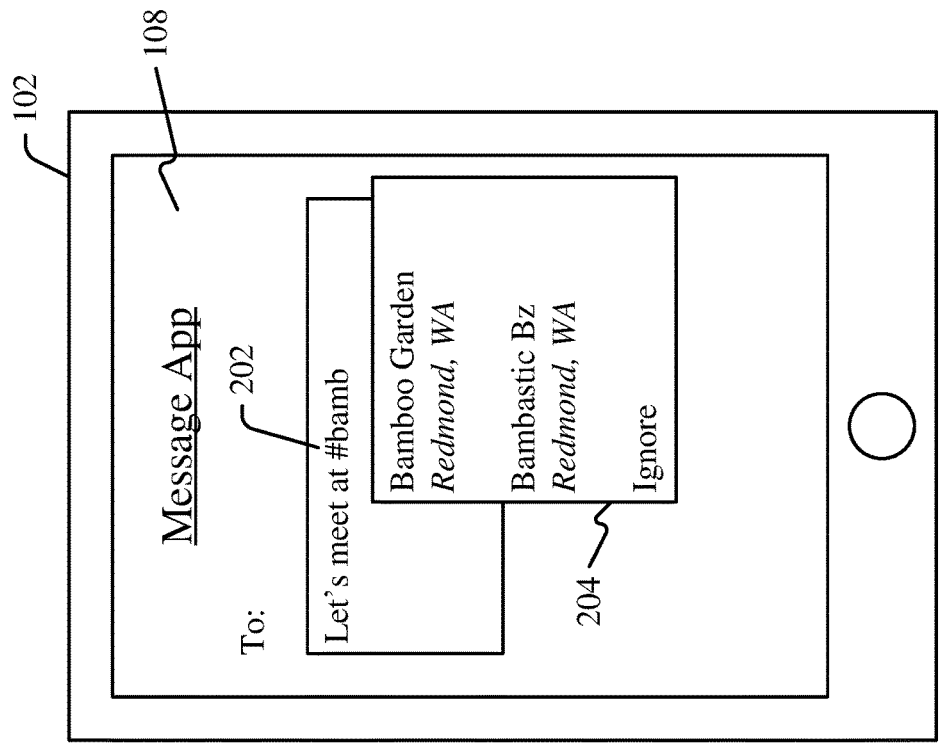
FIGS. 1-4 are block diagrams of views of an example message composition application.

Short Message Service (SMS) messages are used to communicate information. SMS is often used to communicate between cell phones. Typically, the sender of a message composes a message and directs the message to the recipient's phone number. The message is transmitted to the recipient's phone. SMS software on the recipient's phone notifies the recipient that a message is available and displays the message.

Information can be transmitted between devices in a number of ways, and SMS is merely one of those ways. Many wireless phones function as full Internet-capable devices. Such devices can receive messages in ways other than SMS. For example, a smart phone may receive e-mail, push notifications, or Internet connection requests. By coupling push notifications with the ability to download arbitrary Hypertext Markup Language (HTML) content via Hypertext Transfer Protocol (HTTP), it is possible for Internet-capable phones to send messages to each other while completely bypassing the use of SMS.

In effect, SMS is a legacy technology whose use persists mainly because of its ubiquity. When one person sends a message to another, the sender often does not know what type of phone the recipient has. Nearly all cell phones can receive SMS messages, but only certain kinds of phones can receive messages in other ways. For example, Apple devices can send messages to each other through a protocol called iMessage. However, people often do not want to have to keep track of what brands of phones are owned by people in their contacts list, so—rather than using one brand's proprietary messaging system—they simply default to SMS. Additionally, many devices support SMS as part of a high-quality user experience—e.g., providing push notifications and over-the-lock-screen alerts. Other messaging systems could provide a richer experience—e.g., by allowing structured entities to be incorporated into a message—but this sort of experience is difficult to incorporate into an SMS message.

The subject matter herein provides a way to leverage the existing SMS system to provide a richer messaging experience, both on the message authoring side and on the messaging rendering side. The messaging experience may include the use of structured entities in messages. When a user composes a message, the user may include certain types of information that refers to entities. For example, a message might contain the text "John," but that text actually refers to a person who has specific contact information, specific social relationships, etc. Thus, when composing a message, the author might use an escape character such as "#" to write "#John". An appropriate resolution mechanism may be used to disambiguate entities—e.g., in response to the text "#John" (or incrementally as the user types that text), the authoring system might provide a drop-down menu that allows a user to choose between various people named John. People are only one example of entities that could be added to a message. Other examples include dates and times (e.g., using "#615pm" to refer to 6:15 p.m. on the current day) and places (e.g., using "#bamboo-garden" to refer to a nearby restaurant named "Bamboo Garden"). Any of these "entities" may be represented in an appropriate structured form—e.g., a contact card for a person, a calendar entry for a date and time, a place page for a restaurant, or any other named entity.

Once the message has been composed, the author of the message indicates where the message is to be sent. The destination for the message may be a phone number, which may identify a particular phone to which the message is to be sent. The full message—including the entity content—is then transmitted to a server, where it is stored. Transmission of the message to the server may take place by any appropriate mechanism, such as HTTP. Additionally, an SMS message that represents the underlying content of the full message is sent to the destination that the sender identified. The SMS message may contain a text representation of the content that was authored, and may also contain a link to retrieve the full message on the server.

When the SMS message is received on the recipient's device, software on that device may query the server to determine whether the SMS message that was received corresponds to a message containing richer content on the server. For example, the software may send the server the phone numbers of the sender and recipient, a digest of the message, and the time of receipt, and the server may use this information to determine whether it has a rich message corresponding to the SMS message. If it is determined that the SMS message corresponds to richer content, then the software obtains that content from the server and renders the content. When the software at the recipient's device is able to determine that the SMS message refers to rich content available on the server, the software may avoid showing the SMS message itself, since the SMS message is effectively just a legacy representation of the content that was obtained from the server. However, if the recipient's device does not have the software to recognize that the SMS message refers to content on the server, then the SMS message may be shown to the recipient using the recipient's existing SMS software. That SMS message, as noted above, may contain a link to the content on the server, so that the recipient can manually follow the link and obtain the richer content, if the recipient's device is Internet-capable. (If the recipient's device has no way to download the server content, the recipient can still see the basic text of the sender's message, which is contained in the SMS representation of the message.)

It is noted that the description herein uses SMS as an example. However, in the description that follows, any text messaging technology (such as Instant Messaging, or IM) could be used in place of SMS.

Figure 1:
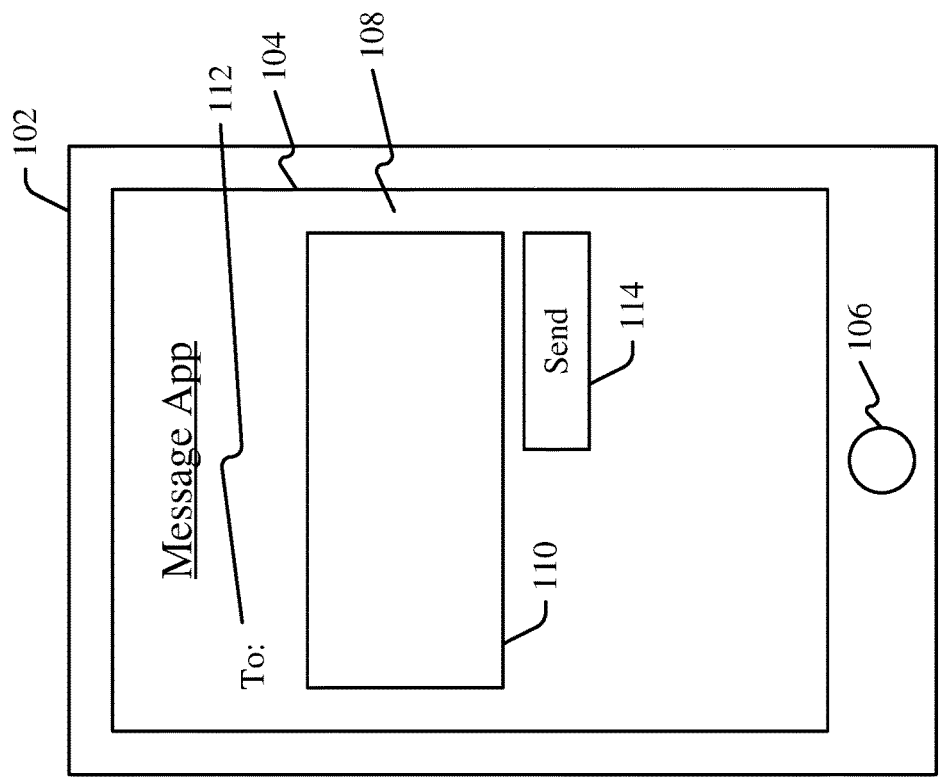

Turning now to the drawings, FIGS. 1-4 show example interfaces of a message composition application. In FIG. 1, device 102 is any type of device that has some communication and computing capability. For example, device 102 may be a smart phone, a tablet, or any other type of device. (In the example of FIGS. 1-4, device 102 is depicted as the non-limiting example of a smart phone.) Device 102 may have a touch screen 104, which serves as an input and output component for device 102. Device 102 may have other components related to input and output, such as button 106, which may be used to return to a desktop or home screen on device 102, or to navigate content on device 102.

Device 102 is capable of running software. One piece of software that may run on device 102 is a message application ("Message App", in the drawings), which presents a user interface through touch screen 104. (Different views of the message application's interface 108 are shown in FIGS. 1-4). In FIG. 1, the message application's interface contains a box 110 that allows a user to compose a message, a space 112 into which destination of the message may be entered, and a send button 114 that is used to indicate that the message is to be sent.

In FIG. 2, interface 108 is being used on device 102 to compose a message. As can be seen, the user has started to type the message "Let's meet at #bamb . . . ". In this example, the "#" (number sign, or hash mark) character is an escape character 202, indicating that the text that follows that character refers to an entity. When such a character is encountered, the software that the user is using to author the message may provide various suggestions for entities. In the example shown, these suggestions are provided in the form of a drop-down menu 204. Drop-down menu 204 offers several choices for the entities that might match the letters that have been typed after escape character 202. These choices include "Bamboo Garden" and "Bambastic Biz". Drop-down menu 204 may also include an image for each of the items on the menu—e.g., a fork and knife icon next to a restaurant, the silhouette of a person's head next to a person, etc. Additionally, drop-down menu includes an "ignore" option, which, if selected, allows the sequence "#bamb" to be treated as a literal text string to be included in the message, rather than being treated as the indication of an entity.

It is noted that the choice of entities in a menu, and the way in which an ambiguous entity is resolved, may be determined from various contextual information. For example, the choice of entities in a drop-down menu (or the order in which these entities are presented) may be determined based on the history of entities that have been chosen by the user at an earlier time (a user is more likely to choose entities that the user has chosen in the past); or by the location of the user (e.g., a user is more likely to choose Bamboo Garden if he is presently near Bamboo Garden); or based on personalization information such as a social graph (e.g., a person is more likely to write about his or her "friends" in a text message than he or she is to write about people who are very distant from the writer in the social graph). History, location, and position in the social graph are thus all examples of context that may be used in resolving entities, or in determining what to include in a drop-down menu. The information that is used to determine what to include in the menu, or how to resolve an entity name, may come from within the device on which the message is being composed (e.g., the user's smart phone), or from an external source that the device communicates with.

Figure 3:
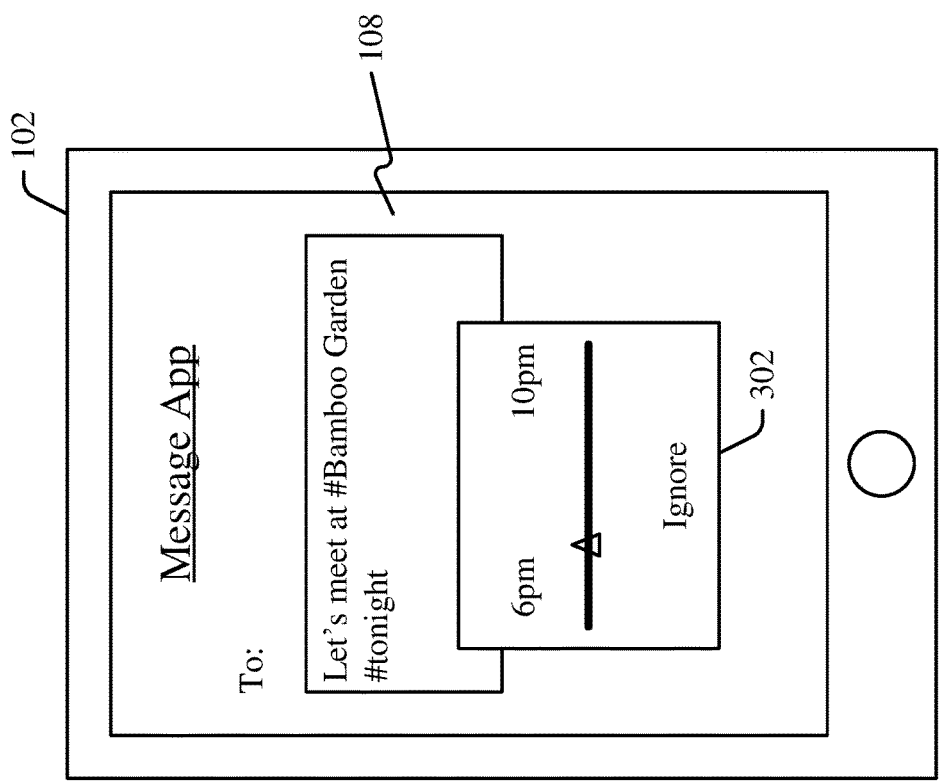

FIG. 3 shows further composition of the message. As in the preceding two figures, interface 108 is shown on device 102. The text string "#bamb" has been resolved to the restaurant entity "Bamboo Garden". During composition of the message, the user types "#tonight." The software may recognize this string as referring to a time entity. In order to facilitate authoring of the message, the software may present a dialog box 302 that allows the user to specify "tonight" more precisely—e.g., by providing a slider, or other user interface element, that allows the user to specify the time. In the example shown, the user chooses 6:30 p.m. as the time. (As another example, the user might have typed "#this week", in which case the dialog box might have presented a calendar to allow the user to choose a date.)

Figure 4:
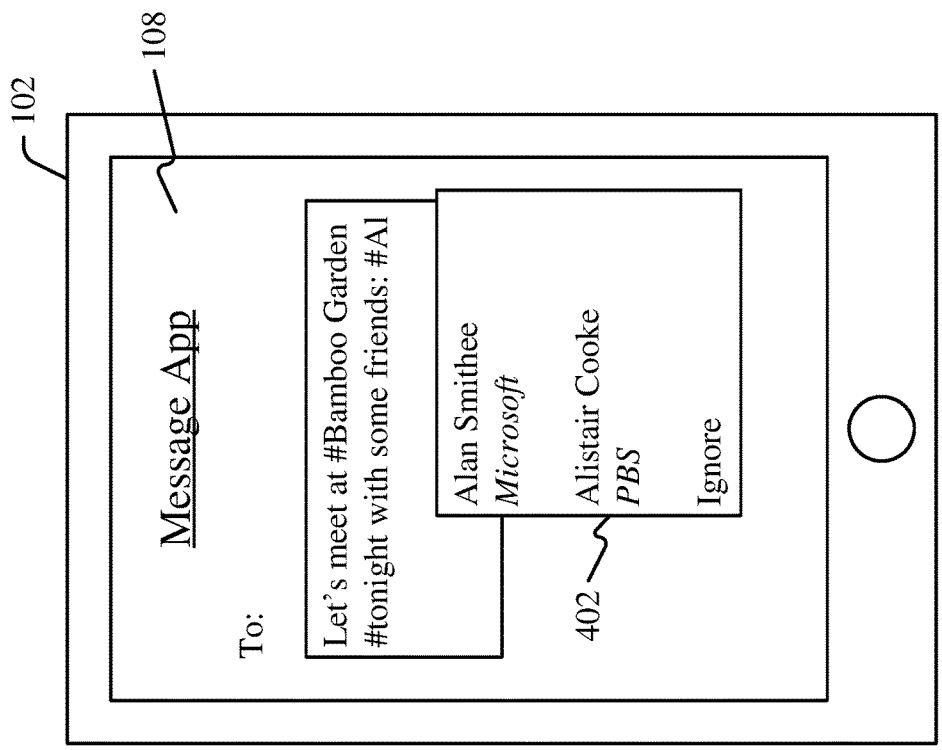

FIG. 4 shows yet further composition of the message. As in the preceding two figures, interface 108 is shown on device 102. The user has indicated a person entity by writing "#Al". The software provides a drop-down menu 402, which provides several choices of names, from which the user can choose to resolve the string "#Al" to a specific entity. In the examples shown in subsequent figures, it is assumed that the user has resolved the entity to "Alan Smithee" by choosing that name from the menu.

One the message has been composed, the message may be sent to its recipients. The sender chooses a recipient (e.g., by entering a phone number, or a name from a contact list, into space 112 shown in FIG. 1). The components involved in sending the message are shown in FIG. 5.

Figure 5:
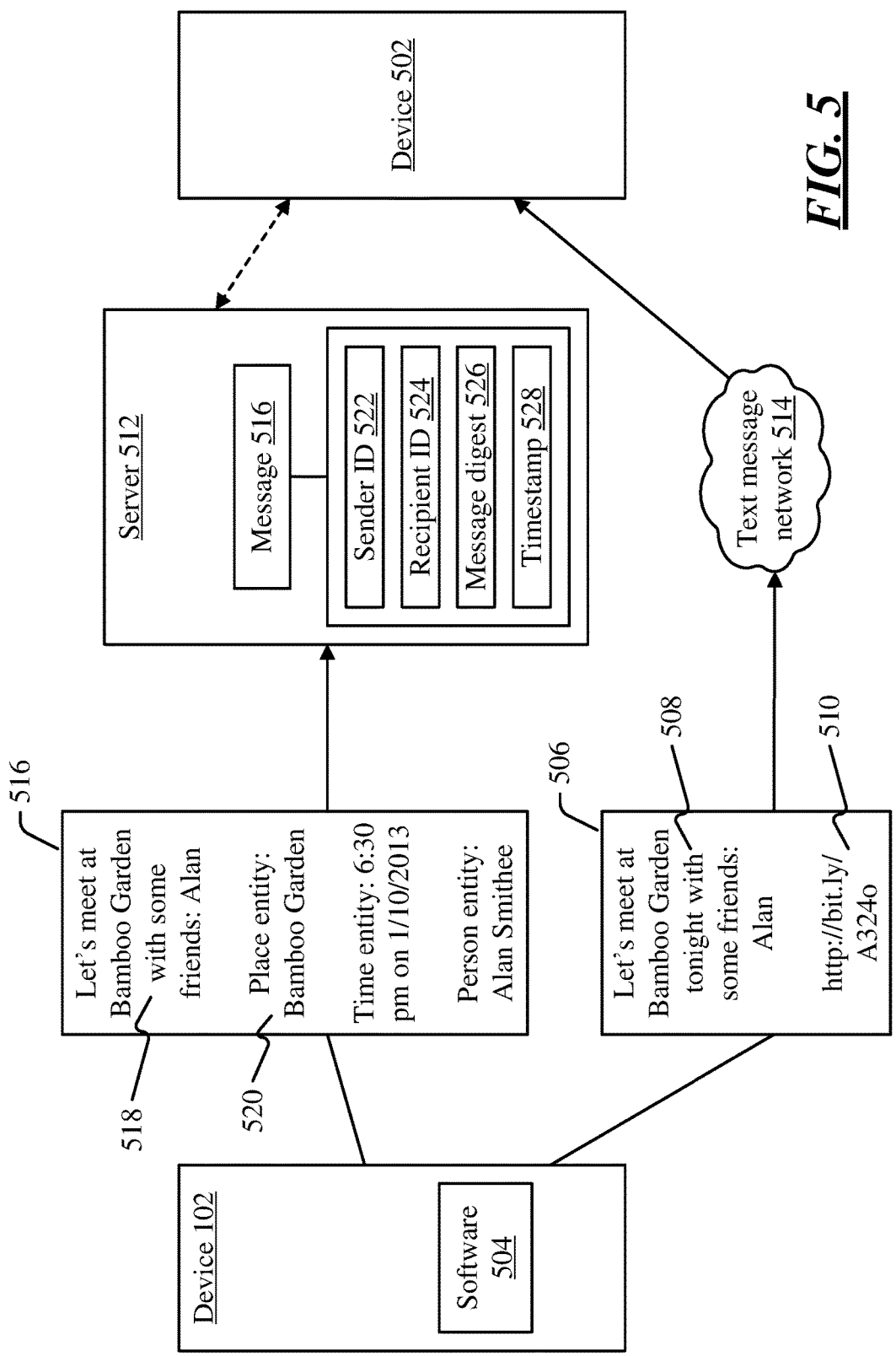
FIG. 5 is a block diagram of example components that may be used in sending a message.

In the example of FIG. 5, device 102 is the sender's device, and device 502 is the recipient's device. Software 504 on sender's device 102 (which may be the same software that was used to author the content that the sender wants to send) creates two representation of the content: an SMS message 506, and a "rich" message that represents the authored text and the entities that are referred to in that text. SMS message contains text 508 and a link 510. Text 508 is the textual content that was authored by the sender. Link 510 is a link to the rich message that will be stored on server 512. In the example of FIG. 5, link 510 is shown as a "short" link (using the Uniform Resource Locator ("URL") shortening service "bit.ly", or any other shortening service), although link 510 could take any form. SMS message 506 is sent to recipient's device 502 using the normal SMS delivery mechanisms provided by a text message network 514 (e.g., the cell phone system that is used to deliver SMS messages).

In addition to the SMS message representation of the underlying content, "rich" message 516 is also created. Rich message 516 contains text 518, which is the textual content of the message. Rich message 516 may also contains entities 520. Entities 520 may be represented in any appropriate manner. For example, a place entity may be represented by its "place page" on a service such as Yelp; or, as another example, a place entity could be represented on a map with its location and the hours that it is open. A date/time entity may be represented as an iCalendar (".ics") file, or as a link to an item on a person's calendar. A person entity may be represented as that person's entry in a directory or a contact list. The representation may include a copy of the information about the entity (e.g., a copy of a person's entry in a directory), or may be a reference to an object that is stored and maintained elsewhere (e.g., a link to a person's listing in an online directory). Any appropriate entity representation may be used. The rich message 516 may be sent to server 512 using any appropriate communication protocol, such as HTTP.

Once the message arrives at server 512, it is stored. Message 516 may be stored in association with various pieces of identifying data. These data may include a sender ID 522 (e.g., the sender's phone number), a recipient ID 524 (e.g., the recipient's phone number), a message digest 526 (e.g., a hash of the SMS message), and a timestamp 528 (indicating the time at which the message was sent and/or received).

As indicated by the dotted line between server 512 and device 502, message 516 may be transmitted to device 502 as part of processes that are described below in connection with FIG. 9.

Figure 6:
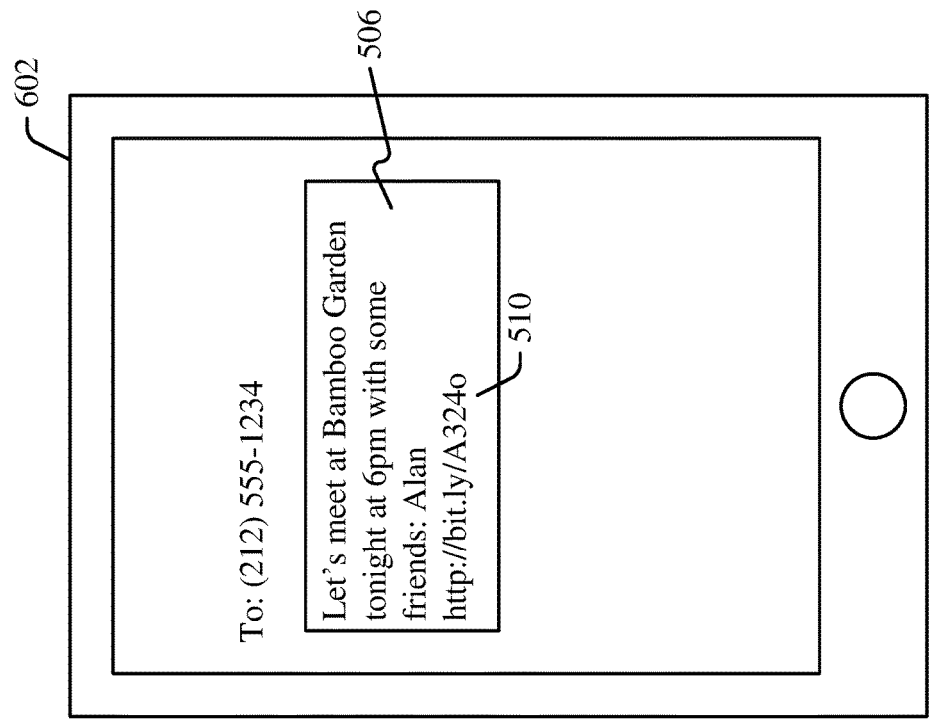

FIG. 6 shows what may happen when the SMS message is received by a device with ordinary SMS software—i.e., software that is not capable of associating the SMS message with an underlying richer message. Device 602 (e.g., a cell phone) is a device that receives the SMS message. Software on device 602 treats the SMS message 506 as being an ordinary SMS message, so it simply displays the message. As noted above, the message contains a link 510, which points to the underlying message stored on server 512 (shown in FIG. 5). If device 602 has the capability to visit a web site (e.g., if device 602 has a web browser), then the user may retrieve link 510 in order to view the underlying content.

Figure 7:
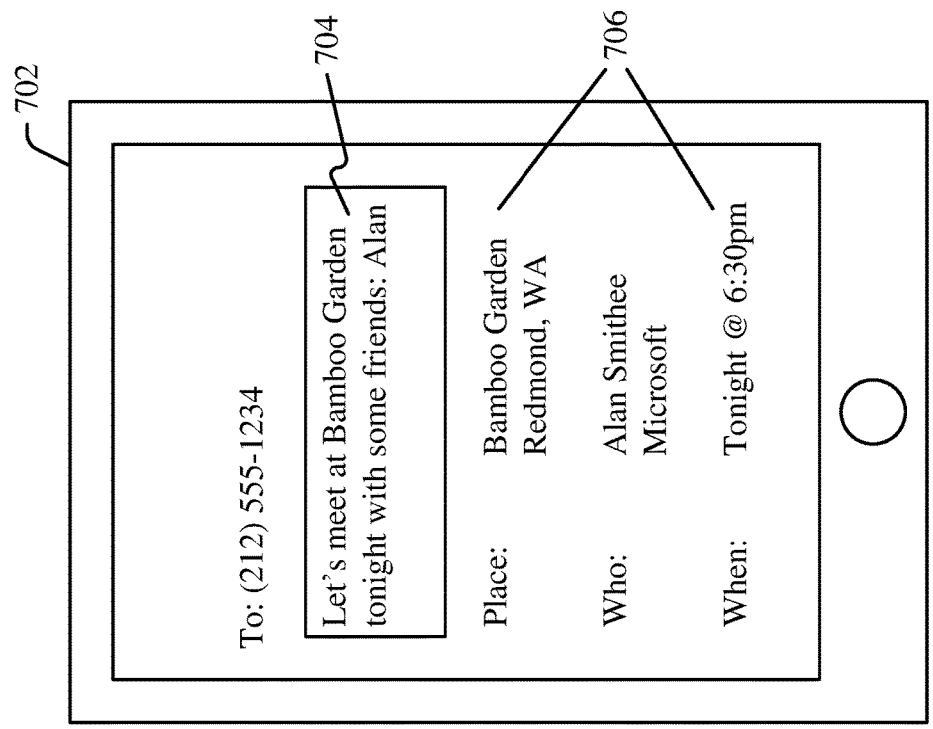
FIGS. 6 and 7 are block diagrams of devices that have received a message.

FIG. 7 shows what may happen when the SMS message is received by a device that has software that is capable of associating the SMS message with an underlying rich message. When device 702 receives the SMS message, it may contact server 512 (shown in FIG. 5) to determine whether the SMS message is associated with content stored on that server. In one example, software on device 702 calculates a digest (e.g., hash) of the message, and then queries the server as to whether the server has a message associated with (a) the calculated hash, (b) the sender of the SMS message, (c) the recipient of the SMS message, and (d) a timestamp that is within some range of when the SMS message was received. As noted above in connection with FIG. 5, the server may associate each message with those items of data (see items 522-528 in FIG. 5). Thus, the server can make a finding as to whether content corresponding to the SMS message exists on the server. If such content does exist, then the content is transmitted to device 702 (e.g., via HTTP, or some other non-SMS protocol). Device 702 may then display that content, including, for example, text 704, and any entity information 706. In the example of FIG. 7, the entity information is shown in a separate area from said text. The example shows the entities underneath the text, although the entities could be shown above the text, next to the text, on a separate screen from the text—all of which are examples of showing the entities separate from the text. As noted above, when the SMS message is determined to correspond to content stored on server 512 (shown in FIG. 5), the SMS message is effectively understood as a legacy representation of that content, so device 702 may avoid actually showing the SMS message itself.

Figure 8:
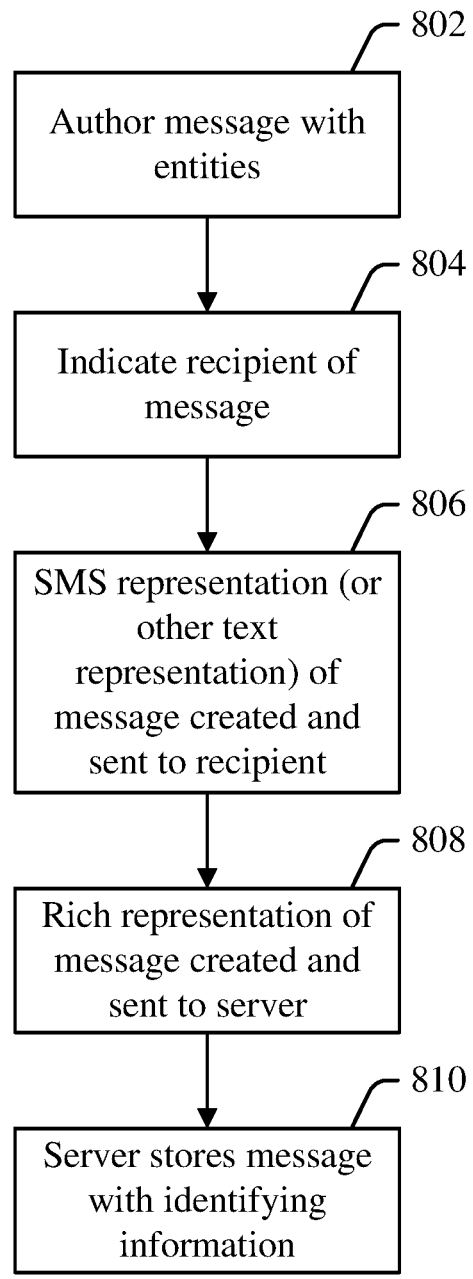
FIG. 8 is a flow diagram of an example process of creating a message with entity content.

FIG. 8 shows an example process of creating a message with entity content. At 802, a user authors a message, including entity content as shown in FIGS. 1-4. At 804, the user indicates the recipient of the message—e.g., by specifying the recipient's phone number, or by choosing the recipient from a contacts list. At 806, an SMS representation of the message is created, and is sent to the recipient via SMS. At 808, a rich representation of the message is created (including representations of the entities in the message), and the rich representation is sent to a server. At 810, the server stores the rich representation of the message. The server may associate the message with various identifying indicia—e.g., the sender's and recipient's phone number, a timestamp, and a digest of the SMS message, as mentioned above.

Figure 9:
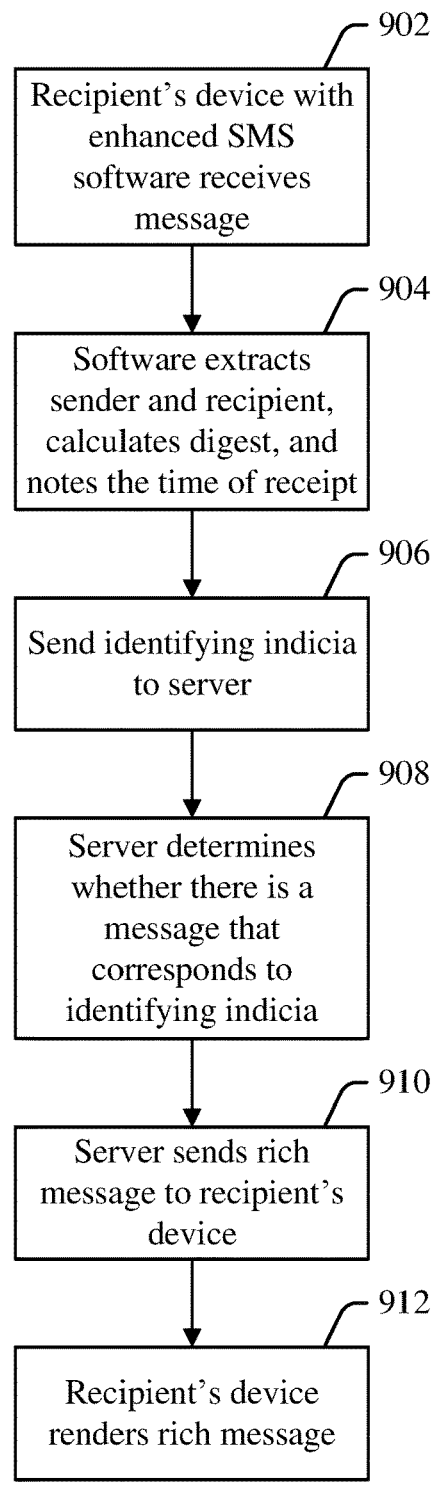
FIG. 9 shows an example process in which a device receives a text message and uses the text message to obtain rich content.

FIG. 9 shows an example process in which a device receives an SMS message and uses the SMS message to obtain rich content. At 902, the SMS message is received at a device that has enhanced SMS software. The SMS software, in this example, is "enhanced" in the sense that the software is able to determine whether an SMS message corresponds to richer content that is stored elsewhere. In order to make this determination, the software (at 904) may extract the sender and recipient from the SMS message, calculates a digest of the SMS message, and notes the time of receipt. At 906, the identifying indicia are sent to the server where rich messages are stored.

At 908, the server determines whether there is a message that corresponds to the identifying indicia. For example, if the identifying indicia comprise the sender's and recipient's phone numbers, a digest of the SMS message, and the time of receipt, then the server may examine stored messages to determine which ones have matching phone numbers and SMS message digests, and also have timestamps that are close in time to the time at which the message was received.

If the server determines that a rich message corresponding to the SMS message exists, then the server sends a representation of the rich message to the recipient's device (at 910). The communication of the rich message content may be performed using any communication protocol, such as HTTP. Once the recipient's device has received the content, the device renders the content in an appropriate format (at 912). For example, the client may display the text of the message, and may also render any entity content such as maps (for place entities), contact cards (for person entities), calendar pages (for date/time entities), etc. FIG. 7, discussed above, shows an example of rich content being displayed in an appropriate format. If the entity content contains a reference to content that is stored elsewhere, then software on the recipient's device retrieves and/or generates the appropriate content. An example of retrieving content stored elsewhere is when a place entity is represented by a link to the entity's place page, in which case obtaining the content may be performed by requesting the link. An example of creating content is where a place entity is associated with a map, in which case appropriate mapping software may be used to retrieve map data and/or generate the map.

Figure 10:
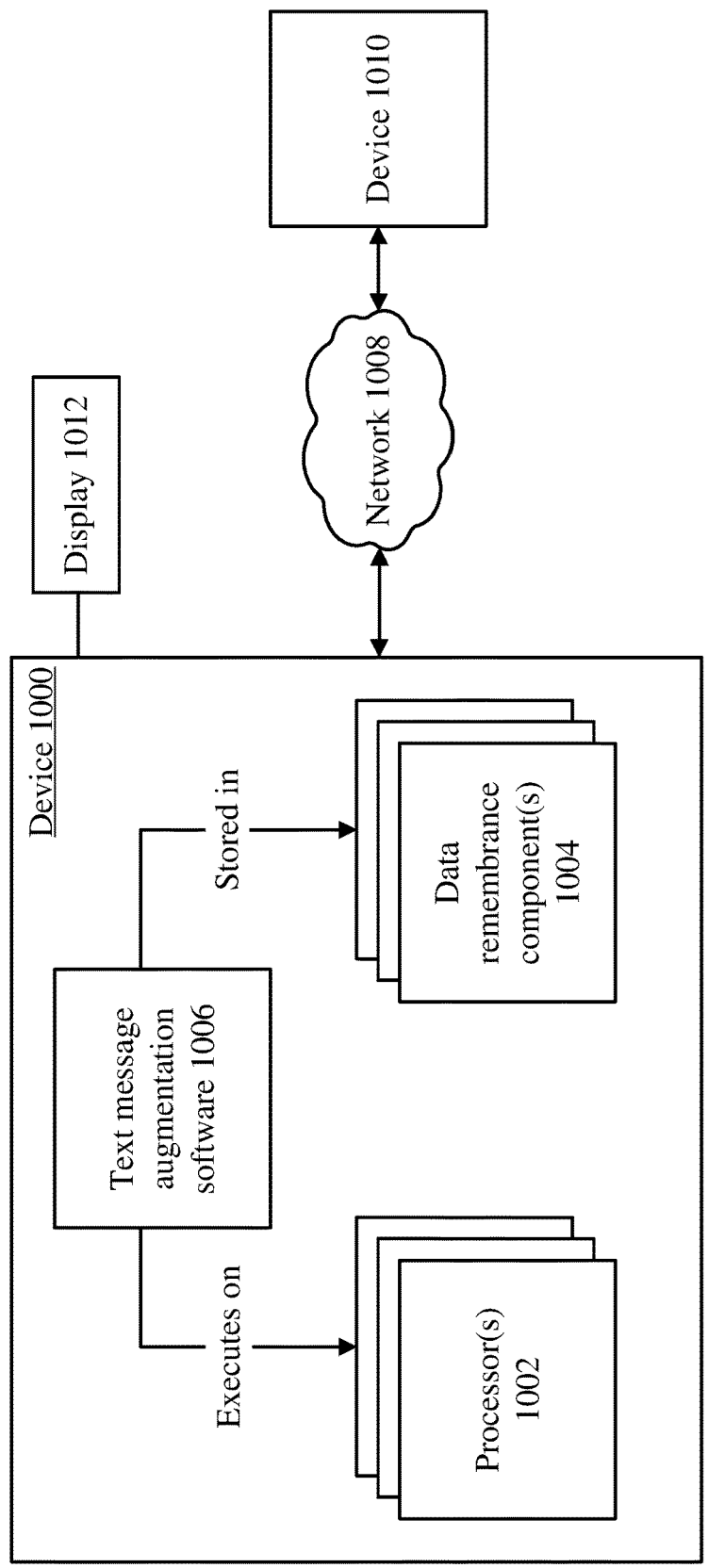
FIG. 10 is a block diagram of example components that may be used in connection with implementations of the subject matter described herein.

FIG. 10 shows an example environment in which aspects of the subject matter described herein may be deployed.

Device 1000 includes one or more processors 1002 and one or more data remembrance components 1004. Device 1000 may be any type of device with some computing power. A smart phone is one example of device 1000, although device 1000 could be a desktop computer, laptop computer, tablet computer, set top box, or any other appropriate type of device. Processor(s) 1002 are typically microprocessors, such as those found in a personal desktop or laptop computer, a server, a handheld computer, or another kind of computing device. Data remembrance component(s) 1004 are components that are capable of storing data for either the short or long term. Examples of data remembrance component(s) 1004 include hard disks, removable disks (including optical and magnetic disks), volatile and non-volatile random-access memory (RAM), read-only memory (ROM), flash memory, magnetic tape, etc. Data remembrance component(s) are examples of computer-readable (or device-readable) storage media. Device 1000 may comprise, or be associated with, display 1012, which may be a cathode ray tube (CRT) monitor, a liquid crystal display (LCD) monitor, or any other type of monitor. Display 1012 may be an output-only type of display; however, in another non-limiting example, display 1012 may be (or comprise) a touch screen that is capable of both displaying and receiving information.

Software may be stored in the data remembrance component(s) 1004, and may execute on the one or more processor(s) 1002. An example of such software is text message augmentation software 1006, which may implement some or all of the functionality described above in connection with FIGS. 1-9, although any type of software could be used. Software 1006 may be implemented, for example, through one or more components, which may be components in a distributed system, separate files, separate functions, separate objects, separate lines of code, etc. A device (e.g., smart phone, personal computer, server computer, handheld computer, tablet computer, set top box, etc.) in which a program is stored on hard disk, loaded into RAM, and executed on the device's processor(s) typifies the scenario depicted in FIG. 10, although the subject matter described herein is not limited to this example.

The subject matter described herein can be implemented as software that is stored in one or more of the data remembrance component(s) 1004 and that executes on one or more of the processor(s) 1002. As another example, the subject matter can be implemented as instructions that are stored on one or more device-readable media. Such instructions, when executed by a phone, a computer, or another machine, may cause the phone, computer, or other machine to perform one or more acts of a method. The instructions to perform the acts could be stored on one medium, or could be spread out across plural media, so that the instructions might appear collectively on the one or more computer-readable (or device-readable) media, regardless of whether all of the instructions happen to be on the same medium.

Computer-readable media includes, at least, two types of computer-readable media, namely computer storage media and communication media. Likewise, device-readable media includes, at least, two types of device-readable media, namely device storage media and communication media.

Computer storage media (or device storage media) includes volatile and non-volatile, removable and non-removable media implemented in any method or technology for storage of information such as computer readable instructions, data structures, program modules, or other data. Computer storage media (and device storage media) includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computer or other type of device.

In contrast, communication media may embody computer readable instructions, data structures, program modules, or other data in a modulated data signal, such as a carrier wave, or other transmission mechanism. As defined herein, computer storage media does not include communication media. Likewise, device storage media does not include communication media.

Additionally, any acts described herein (whether or not shown in a diagram) may be performed by a processor (e.g., one or more of processors 1002) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, device 1000 may be communicatively connected to one or more other devices through network 1008. device 1010, which may be similar in structure to device 1000, is an example of a device that can be connected to device 1000, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
receiving, via a computer system, a first message that is sent using a communication protocol;
sending, via the computer system, indicia of the first message to a server;
sending, via the computer system, a request for the server to make a determination, based on the indicia, whether the server has a second message that corresponds to the first message, with the requested determination to be made based on a finding that a time at which the first message was received is within a range of a timestamp that the server associated with the second message;
receiving, via the computer system, the second message from the server, the second message comprising text and an entity, the first message comprising the text and a text representation of the entity; and
displaying, via the computer system, the text and the entity to a user without displaying the first message.

2. The method of claim 1, with the indicia comprising a digest of the first message.

3. The method of claim 2, with the indicia comprising a time at which the first message was received.

4. The method of claim 3, with the indicia comprising a first phone number of a sender of the first message and a second phone number of a recipient of the first message.

5. The method of claim 3, wherein the timestamp that the server associated with the second message was associated with the second message at a time at which the second message was received by the server from a sender of the first message.

6. The method of claim 1, with the entity comprising a date and time, the displaying comprising displaying the date and the time separate from the text.

7. The method of claim 1, with the entity comprising a person, the displaying comprising displaying contact information for the person separate from the text.

8. The method of claim 1, with the entity comprising a place, the displaying comprising displaying a place page of the place, or a map of a location of the place, separate from the text.

9. A computer system comprising:
memory;
one or more processors;
a display; and
a component stored in the memory, that when executed with the one or more processors, performs acts comprising:
receiving a first message that is sent using a communication protocol;
sending indicia of the first message to a server;
requesting that the server make a determination, based on the indicia, whether the server has a second message that corresponds to the first message, with the requested determination to be made based on a finding that a time at which the first message was received is within a range of a timestamp that the server associated with the second message;
receiving the second message from the server, the second message comprising text and an entity, the first message comprising the text and a text representation of the entity; and
displaying, on the display, the text and the entity to a user without displaying the first message.

10. The system of claim 9, with the indicia comprising a digest of the first message, a first phone number of a sender of the first message, a second phone number of a recipient of the first message, and a time at which the first message was received.

11. The system of claim 10, with the determination being made based on a finding that the time at which the first message was received is within a range of a timestamp that the server associated with the second message at a time at which the second message was received by the server from the sender.

12. The system of claim 9, with the entity comprising a date and time, the displaying comprising displaying the date and the time separate from the text.

13. The system of claim 9, with the entity comprising a person, the displaying comprising displaying contact information for the person separate from the text.

14. The system of claim 9, with the entity comprising a place, the displaying comprising displaying a place page of the place, or a map of a location of the place, separate from the text.

15. One or more computer-readable memory having computer-executable instructions embodied thereon that, when executed by at least one processor, cause at least one processor to perform acts comprising:
receiving, via a computer system, a first message that is sent using a communication protocol;
sending, via the computer system, indicia of the first message to a server;
sending, via the computer system, a request for the server to make a determination, based on the indicia, whether the server has a second message that corresponds to the first message, with the requested determination to be made based on a finding that a time at which the first message was received is within a range of a timestamp that the server associated with the second message;

receiving, via the computer system, the second message from the server, the second message comprising text and an entity, the first message comprising the text and a text representation of the entity; and displaying, via the computer system, the text and the entity to a user without displaying the first message.

16. The one or more computer-readable memory of claim 15, with the indicia comprising a digest of the first message.

17. The one or more computer-readable memory of claim 16, with the indicia comprising a time at which the first message was received.

18. The one or more computer-readable memory of claim 17, with the indicia comprising a first phone number of a sender of the first message and a second phone number of a recipient of the first message.

19. The one or more computer-readable memory of claim 18, wherein the timestamp that the server associated with the second message was associated with the second message at a time at which the second message was received by the server from the sender.

20. The one or more computer-readable memory of claim 15, with the entity comprising a date and time, the displaying comprising displaying the date and the time separate from the text.

* * * * *